(12) United States Patent
Berberich et al.

(10) Patent No.: US 6,819,231 B2
(45) Date of Patent: Nov. 16, 2004

(54) PARKING AND/OR MANEUVERING ASSISTANCE DEVICE (75) Inventors: Wolfgang Berberich, Freudenberg (DE); Barbara Kolbe, Wertheim (DE); Edwin Seitz, Stadtprozelten (DE); Werner Seitz, Collenberg (DE); Tim Weis, Bensheim (DE)

(73) Assignee: Donnelly Hohe GmbH & Co. KG, Collenberg (DE)

( * ) Notice: Subject to any disclaimer, the term of this patent is extended or adjusted under 35 U.S.C. 154(b) by 89 days.

(21) Appl. No.: 10/357,916

(22) Filed: Feb. 4, 2003

(65) Prior Publication Data

US 2003/0146831 A1 Aug. 7, 2003

(30) Foreign Application Priority Data

Feb. 5, 2002 (DE) .......................................... 102 04 764
Oct. 9, 2002 (DE) .......................................... 102 47 056

(51) Int. Cl.[7] .................................................. B60Q 1/00
(52) U.S. Cl. ..................... 340/435; 340/436; 340/932.2; 340/937; 348/148; 348/143
(58) Field of Search ................................ 340/435, 436, 340/932.2, 937; 348/148, 143; 180/281, 286; 346/107.2

(56) References Cited

U.S. PATENT DOCUMENTS

| | | | |
|---|---|---|---|
| 5,121,200 A | * | 6/1992 | Choi ........................... 348/148 |
| 5,624,591 A | | 4/1997 | Di Trapani |
| 5,793,308 A | * | 8/1998 | Rosinski et al. ............. 340/903 |
| 6,115,651 A | * | 9/2000 | Cruz ............................... 701/1 |
| 6,222,447 B1 | | 4/2001 | Schofield et al. ........... 340/461 |
| 6,473,001 B1 | | 10/2002 | Blum .......................... 340/937 |
| 6,477,334 B1 | * | 11/2002 | Chen ........................... 396/429 |
| 6,524,020 B2 | * | 2/2003 | Ellinger et al. ............. 396/419 |
| 2001/0040505 A1 | * | 11/2001 | Ishida et al. ................. 340/435 |
| 2002/0003571 A1 | * | 1/2002 | Schofield et al. ........... 348/148 |
| 2002/0113415 A1 | | 8/2002 | Pochmuller |

FOREIGN PATENT DOCUMENTS

| | | |
|---|---|---|
| DE | 195 39 642 A1 | 11/1996 |
| DE | 195 33 761 A1 | 3/1999 |
| DE | 198 01 884 A1 | 7/1999 |
| DE | 100 37 129 A1 | 4/2001 |
| DE | 100 37 128 A1 | 5/2001 |
| DE | 100 13 425 A1 | 9/2001 |
| JP | 58185325 A | 10/1983 |

* cited by examiner

Primary Examiner—Daniel J. Wu
Assistant Examiner—Samuel J. Walk
(74) Attorney, Agent, or Firm—McGlew and Tuttle, P.C (57) ABSTRACT A parking and/or maneuvering assistance device for a passenger vehicle or a commercial vehicle is provided with an image acquisition unit (01), e.g., a video camera, and a graphic display unit with which the image information recorded by the image acquisition unit (01) can be displayed in the interior of the vehicle either with or without processing. The image acquisition unit (01) is situated behind a protective element (07), so it is essentially inaccessible from the outside in a resting position, whereby a opening (08) allocated to the image acquisition unit (01) is provided in the protective element (07).

22 Claims, 7 Drawing Sheets

PARKING AND/OR MANEUVERING ASSISTANCE DEVICE

FIELD OF THE INVENTION

This invention relates to a parking and/or maneuvering assistance device for passenger vehicles or commercial vehicles comprising an image acquisition unit, e.g., a video camera, and a graphic display unit with which the image information recorded by the image acquisition unit can be displayed in the interior of the vehicle either with or without processing.

BACKGROUND OF THE INVENTION

To be able to guarantee safe parking and/or maneuvering, for example, observation of the rear space behind a vehicle is indispensable. However, if there are only rearview mirrors in the vehicle, this results in dead angles (so-called blind spots) where the driver cannot see due to the inadequate observation range of the mirrors in the rear space.

Due to the use of image acquisition units such as video cameras whose images are displayed on a graphic display unit (monitor) set up in the interior of the vehicle, the areas that cannot be observed with the conventional mirror may also be displayed for the driver so that the driver has an essentially complete overview of basically any desired observation area. The image information picked up by the image acquisition units may be relayed without processing and displayed as a simple television image. However, there are also known systems for processing the image information acquired by the image acquisition unit, making it possible to display for the driver the vehicle together with the environment as a schematic diagram from a birds-eye view.

German Patent Applications DL 100 37 128A1 and DE 100 37 129A1 each describe generic parking and/or maneuvering assistance devices. With the systems described there, a video camera is mounted on the trunk of the vehicle or four video cameras are mounted one on each of the four corners of the vehicle. The video cameras are each mounted outside the vehicle so that the observation area which is predetermined accordingly can be recorded by the video camera with no problem.

Further rear viewing vision systems are known in the art, for example U.S. Pat. No. 6,222,447 discloses a rear view vision system with indicia of backup travel and U.S. Pat. No. 6,473,001 discloses electronic lateral viewers for a vehicle.

One disadvantage of the known parking and/or maneuvering assistance devices is that they are relatively susceptible to trouble. First, the image acquisition units are exposed to a very high dirt and moisture burden due to their being situated outside the vehicle. In particular, the lens systems of the video cameras must therefore be cleaned frequently. Furthermore, the video cameras are not protected from deliberate vandalism because of their being situated outside the vehicle. In addition, driving resistance is increased by the video cameras mounted outside the vehicle body, which ultimately has a negative effect on the streamlining of the vehicle.

SUMMARY OF THE INVENTION

Therefore, the object of the present invention is to propose a new parking and/or maneuvering assistance device with regard to the arrangement of the image acquisition unit.

According to this invention a parking and/or maneuvering assistance device is provided for a passenger vehicle or a commercial vehicle comprising an image acquisition unit, e.g., a video camera, and a graphic display unit with which the image information recorded by the image acquisition unit can be displayed in the interior of the vehicle either with or without processing. The image acquisition unit is arranged behind a protective element so that it is essentially inaccessible from the outside. This protective element may be formed by parts of the vehicle body, especially the trunk lid, so that no additional expense is required for the protective element itself. According to this invention, an opening is provided in the protective element. The purpose of this opening is so that the given observation area can be recorded with the image acquisition unit.

With the arrangement or the image acquisition unit behind the protective element, there are basically two alternatives. According to the first alternative, the image acquisition unit is mounted rigidly behind the protective element. The lens systems that are used, the design of the opening and the relative arrangement between the image acquisition unit and the opening are selected so that images can be recorded of the desired observation area outside the vehicle through the opening in the protective element.

According to the second alternative, the image acquisition unit is adjustably mounted behind the protective element and can be adjusted by means of a drive mechanism between the resting position and at least one operating position different from the former. This makes it possible in particular for the image acquisition unit to be moved forward in approaching the operating position to the extent that at least parts of the image acquisition unit extend a short distance through the opening. Therefore, it is possible, for example, for the camera lens system of a video camera to be moved forward to the extent that the angle of view is no longer restricted by the protective element and thus very large observation areas can be recorded, depending on the properties of the lens system, e.g., when using a wide-angle lens system.

The drive mechanism for adjusting of the image acquisition unit may be optionally designed as an electric, pneumatic or hydraulic geared motor, or as an alternative to that, in the manner of a bimetal unit.

To be able to reliably prevent soiling of the image acquisition unit, it is especially advantageous if the opening in the protective element is sealed with a transparent cover element. Therefore, it is possible in particular to form a space which is essentially closed to the outside and in which the image acquisition unit is then situated. If the cover element is mounted behind the opening, the image acquisition unit may not be adjusted through the opening in this case.

Due to temperature differences and high atmospheric humidity accordingly, a film of water condensation may develop on the cover element, thus having a negative effect on the transparency properties. It is therefore especially advantageous if the cover element can be heated, so that thawing of the image acquisition unit is made possible in accordance with the functioning of heatable rear windows.

This function can be guaranteed easily by, for example, designing the cover element in the manner of a pane of glass with a conductive coating. By applying a suitable power supply voltage to panes of glass coated in this way, heating of the surface of the glass is made possible.

In the field of automotive engineering, especially in higher-class motor vehicles, the visual design of the vehicle is of supreme importance. If the protective element according to this invention for protection of the image acquisition unit is formed by a part of the vehicle body of the vehicle, for example, then the visual image of the rear body may be impaired by this additional function element. Since the image acquisition unit is used only in very specific driving situations and nonfunctional in most driving situations, it is proposed that to improve the visual impression of the vehicle in these cases, an adjustably mounted cover be provided on the outside of the protective element so that it can be adjusted by a drive mechanism between a resting position and an operating position which is different from the former. In the resting position, the opening in the protective element is essentially completely covered by the cover, so that the opening with the image acquisition unit situated behind it is no longer visible from the outside. The opening is exposed only by moving the cover into the operating position, so that either image recording is possible through the opening or the image acquisition unit can be adjusted outward through the opening. Furthermore, an additional protection of the image acquisition unit from soiling and damage is guaranteed by the cover.

If the image acquisition unit is adjustably mounted and must be moved forward through the opening, then to establish the operating readiness of the device according to this invention, it is necessary for the cover to be opened in combination with the camera being moved forward. It is therefore especially advantageous with systems designed in this way to provide only one common drive mechanism, e.g., a geared motor, for driving both the image acquisition unit and the cover. Then transmission elements, e.g., push rods or speed-transforming gears are provided between the drive mechanism and the cover on the one hand and the image acquisition unit on the other hand, so that when the drive mechanism is triggered, the cover is opened and the image acquisition unit is moved forward at the same time.

If the cover is designed in the manner of a manufacturer's emblem, a nameplate or the like according to a preferred embodiment, then the visual impression of a vehicle equipped with a device according to this invention will not differ at all from that of a vehicle without the device according to this invention. Only by activation of the device according to this invention and the opening of the cover associated with this does the opening in the protective element with the image acquisition unit behind it become visible.

Two different movement kinematics are proposed for adjusting the cover from the resting position into the opened operating position. According to the first movement kinematics, the cover is pivoted about a swivel axis between the resting position and the operating position. This means that in the opened operating position, the cover projects away from the protective element by the corresponding swivel angle and is connected to the protective element only in the area of the swivel axis.

According to the second movement kinematics, the cover is rotatably mounted in an axis of rotation which is situated eccentrically with respect to the center of the cover and extends essentially perpendicular to the plane of the body of the cover. In adjustment of the cover between the resting position and the opened operating position, the cover is rotated about this axis of rotation, with the cover moving in its plane and thus its inside being in direct or indirect contact with the outside of the protective element in all operating situations. As a result, when the cover is opened, the cover executes a wiping movement parallel to the outside of the protective element. If cleaning elements are provided on the side of the cover facing the image acquisition unit, a cleaning of the camera lens system, for example, or some other transparent cover element may be accomplished through the corresponding wiping movement in opening and closing the cover.

To reliably rule out the possibility of dirt penetrating into the area beneath the closed cover, it is especially advantageous if sealing elements, e.g., sealing lips, are provided on the side of the cover facing the image acquisition unit.

In addition, it is especially advantageous if the cover can be locked with a locking element in the resting position. Such locking elements are also known for locking the tank flap, for example. By locking the cover in the resting position, unwanted opening of the cover, especially by force, while the vehicle is parked is reliably prevented, so that damage to the adjustment mechanism and the camera system behind it can be prevented.

To activate the device according to this invention, a separate switching element may be provided in the interior of the vehicle, such that its operation adjusts the image acquisition unit and/or the cover between the resting position and the operating position and vice versa. Thus, by means of the device according to this invention the driver has the option of having the observation area outside the vehicle displayed on the graphic display unit at any time by operating the corresponding switching element. In addition, it is also possible for the device according to this invention to be activated automatically when the vehicle is put in reverse gear, so that the observation area behind the trunk of the vehicle is automatically displayed on the graphic display unit for the driver when driving in reverse.

In order to be able to also effectively use the device according to this invention even when dark, it is especially advantageous if the image acquisition unit has a lighting device. The observation area outside the vehicle may be illuminated with the lighting device either each time the image acquisition unit is activated or only when the ambient light drops below a predetermined brightness level, so that it is possible to record images with sufficiently sharp contours.

Essentially the protective element according to this invention may be formed by any desired component on the vehicle which offers sufficient mechanical strength to protect the image acquisition unit. It is especially advantageous if the protective element is formed by a part of the vehicle body, especially the trunk lid, because components of the vehicle body are to be provided anyway in the manufacture of the vehicle and furthermore, because of their function as part of the vehicle body, they readily offer a sufficient mechanical stability. Mounting in the trunk lid is especially advantageous because in this way the area behind the rear end of the vehicle can be recorded essentially completely with the image acquisition unit. In addition, nameplates or manufacturer's emblems are frequently provided on the trunk lid, so that covering the opening for the image acquisition unit is made possible in a visually attractive manner.

If a display for displaying the data and/or images of a navigation system is provided in the vehicle, it is especially advantageous if the image data of the device according to this invention is displayed on this display. As a result, this eliminates the need for a separate graphic display unit for the device according to this invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
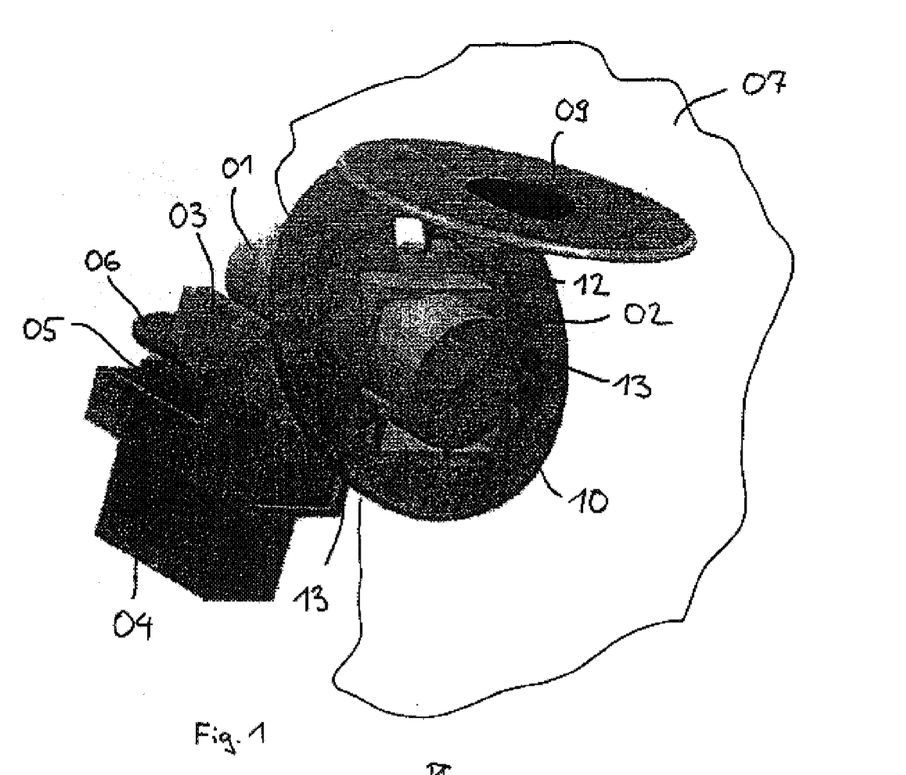
FIG. 1 is a perspective view of a first embodiment of an image acquisition unit for use for a parking or maneuvering assistance device in a perspective view.

Referring to the drawings in particular, the image acquisition unit 01 illustrated in FIG. 1 is designed as an electronic video camera including a CCD chip and has a wide-angle lens system 02. The image acquisition unit 01 is mounted on a carriage 03 which is mounted so it is linearly displaceable on a bearing block 04. The bearing block 04 may be mounted in the interior of a vehicle trunk on mounting elements (not shown in FIG. 1).

To adjust the image acquisition unit 01 by displacement of the carriage 03, an electric geared motor 05 including drive disk 06 is provided on the top side of the bearing block 04. The drive disk 06 engages with the carriage 03, so that the carriage 03 can be pushed or pulled forward or to the rear by a corresponding driving movement of the geared motor 05.

Figure 2:
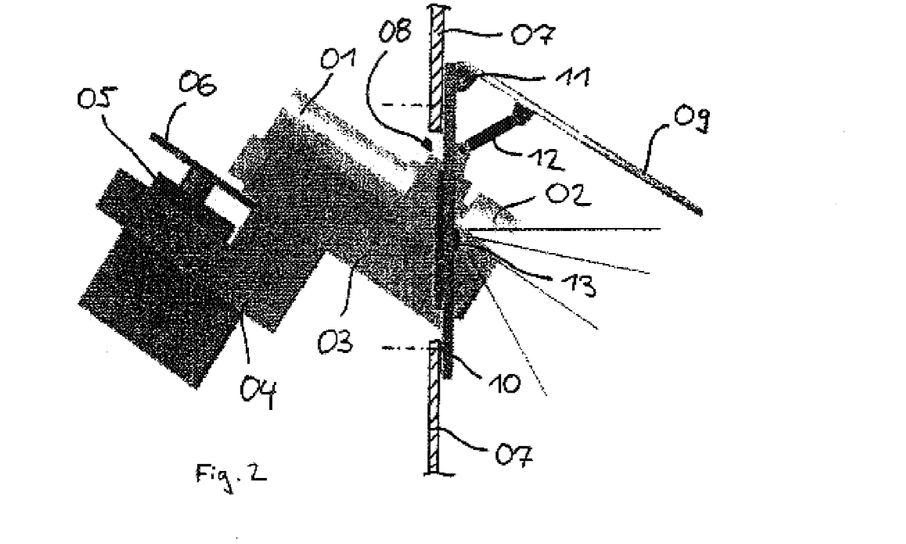
FIG. 2 is a side partially sectional view of the image acquisition unit according to FIG. 1.
Figure 3:
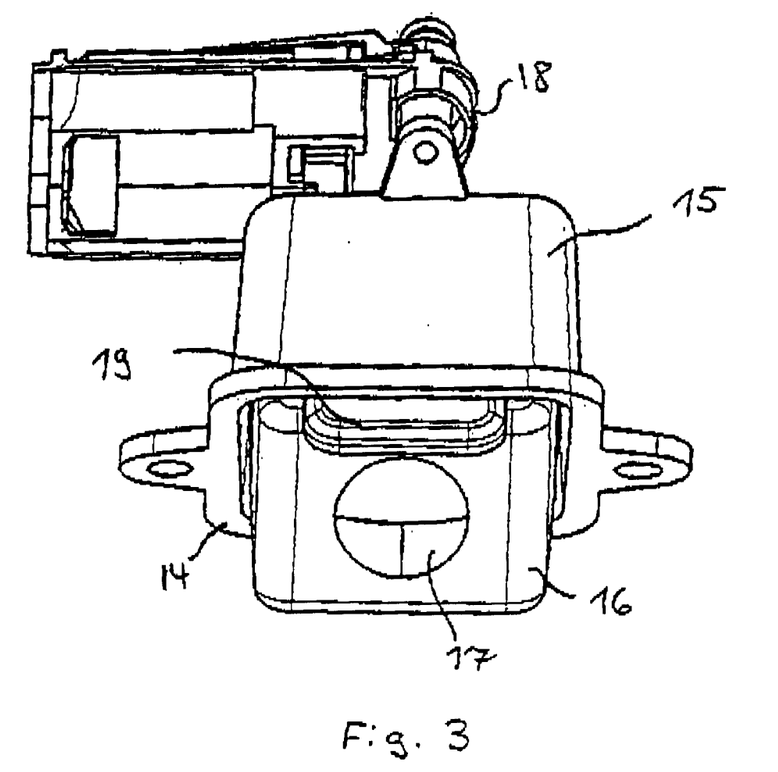
FIG. 3 is a front view of a second embodiment of an image acquisition unit for use for a parking or maneuvering assistance device.

To protect the image acquisition unit 01, it is situated behind a protective element 07, which is formed by the sheet metal of the trunk lid, as illustrated in FIG. 2. To permit images to be recorded with the image acquisition unit 01, an opening 08 is provided in the protective element 07.

To be able to prevent dirt and moisture from penetrating when the image acquisition unit is not activated, a cover 09 is provided on the outside of the protective element 07, said cover being mounted on a mounting plate 10 so it can pivot about a swivel axis 11. The mounting plate 10 is in turn secured on the protective element 07 from the outside with screws or by an adhesive layer, for example, in the area of the opening 08. In addition, the cover 09 is connected to the image acquisition unit 01 by a push rod 12.

FIG. 2 shows the image acquisition unit 01 in the activated state. In this operating state, the image acquisition unit 01 including the lens system 02 passes through the opening 08 in the protective element 07, so that the observation area outside the vehicle can be picked up optimally. To illuminate the observation area under inadequate lighting conditions, two lighting devices 13 are provided in the mounting plate so that the area behind the trunk of the vehicle can be illuminated.

If the image acquisition unit 01 is no longer needed for recording images, the geared motor 05 is driven so that the carriage 03 together with the image acquisition unit 01 is retracted to the extent that the lens system 02 can no longer project outward through the opening 08. Due to the corresponding adjustment movement of the image acquisition unit 01, the push rod 12 is also pulled inward, so that the cover 09 closes over the opening 08. In the rear position of the carriage 03, the cover 09 then forms a tight seal with the mounting plate 10, so that the opening 08 is sealed toward the outside. On activation of the image acquisition unit 01, the carriage 03 is moved forward again in the reverse direction, whereupon the cover 09 opens again and the lens system 02 is moved a short distance farther outward.

A second embodiment 14 of an image acquisition unit for use for a parking or maneuvering assistance device is shown in FIGS. 3 to 6. Image acquisition unit 14 includes a camera housing 15 that may be securely mounted in the vehicle, attached for example on the inside of a trunk lid behind a suitable opening in the trunk lid. With regard to image acquisition unit 14, therefore, a camera 16 is installed in a fixed manner in the vehicle, inside camera housing 15. A remotely adjustable cover 19 including a drive mechanism 18 is provided to protect the camera 16 and the camera lens 17.

Figure 4:
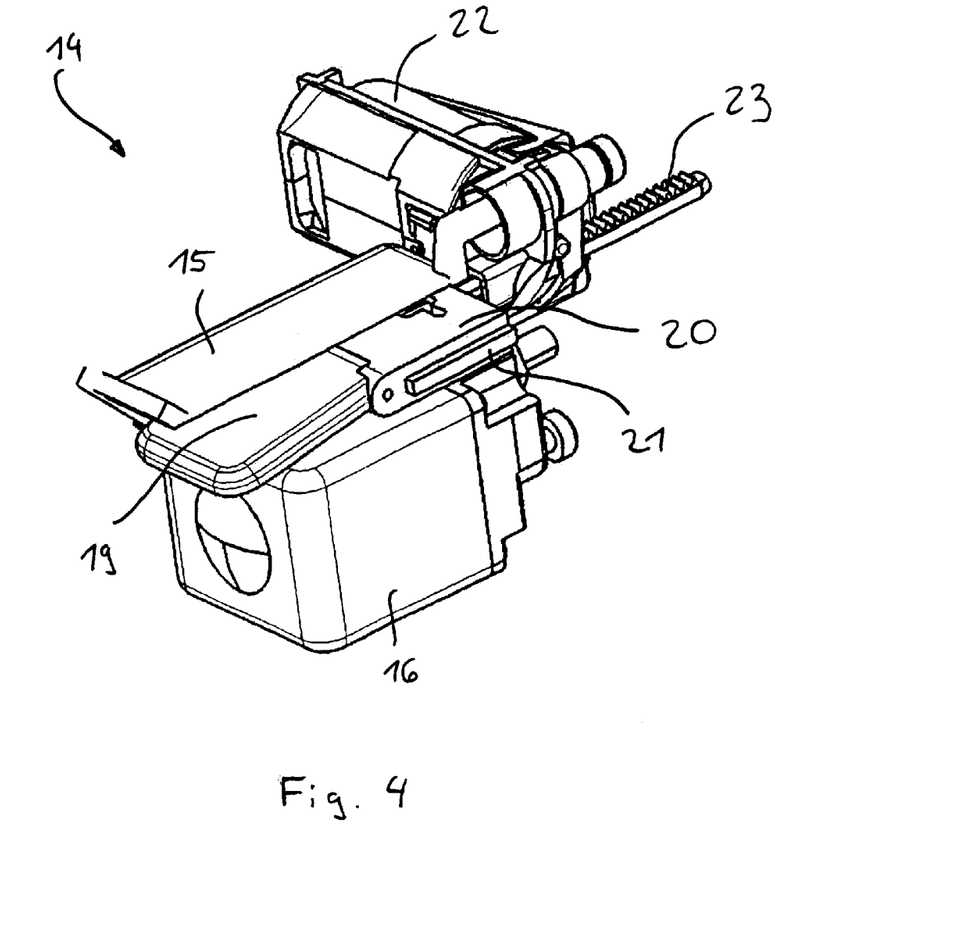
FIG. 4 is a perspective side partially cut away view of an image acquisition unit according to FIG. 3.

FIG. 4 in particular shows that the cover 19 is arranged rotatably on a carriage 20. The camera housing 15 is shown in cutaway in FIG. 4 so that the carriage 20 is more clearly visible. The cover 19 is disposed so as to be movable in the camera housing 15 on guides 21. A spring element (not shown) is provided between cover 19 and carriage 20 and presses the cover 19 downwards into the closed position. This enables the cover 19 to be opened by hand for cleaning purposes even when it is in the closed position simply by overcoming the spring resistance.

The drive mechanism 18 essentially consists of an electric motor 22, which acts on a toothed rack 23 via a gear arrangement. The toothed rack 23 is connected to the carriage 20, with the result that the carriage 20 may be displaced linearly by the action of the electric motor 22.

Figure 5:
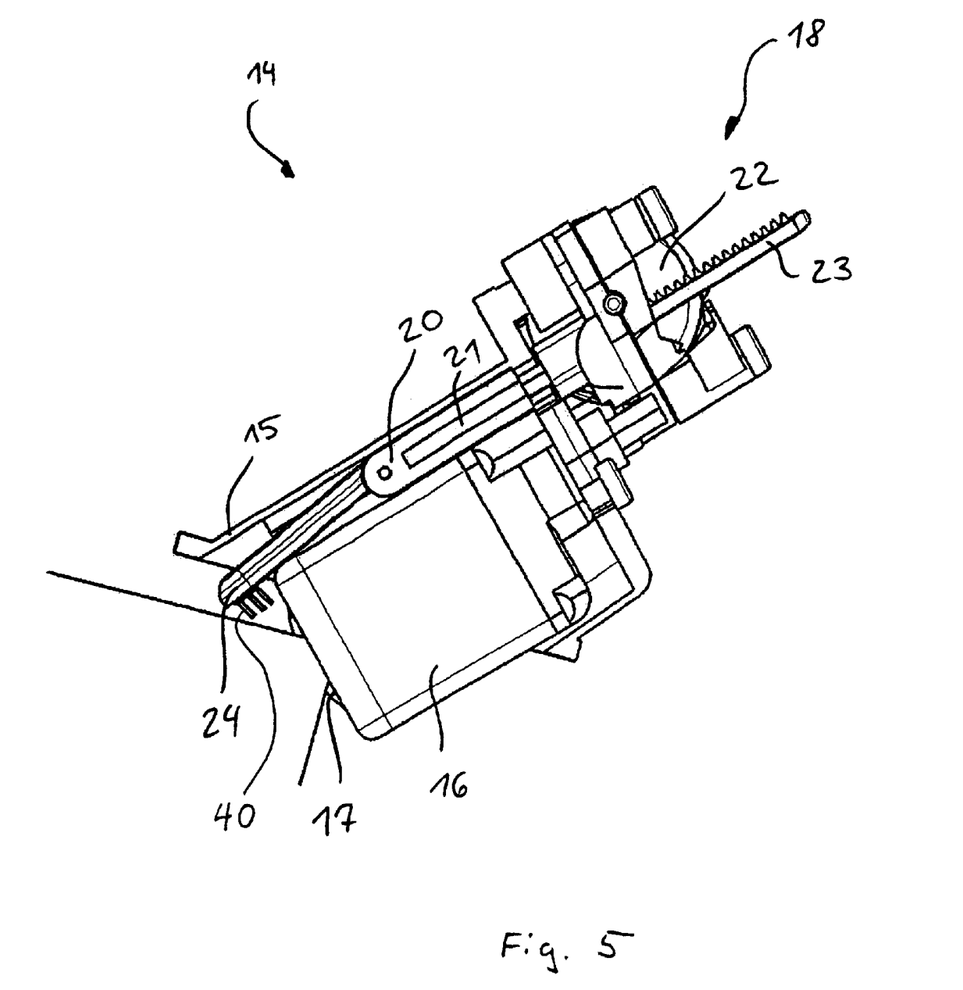
FIG. 5 is a side view of the image acquisition unit according to FIG. 4 in the open position.
Figure 6:
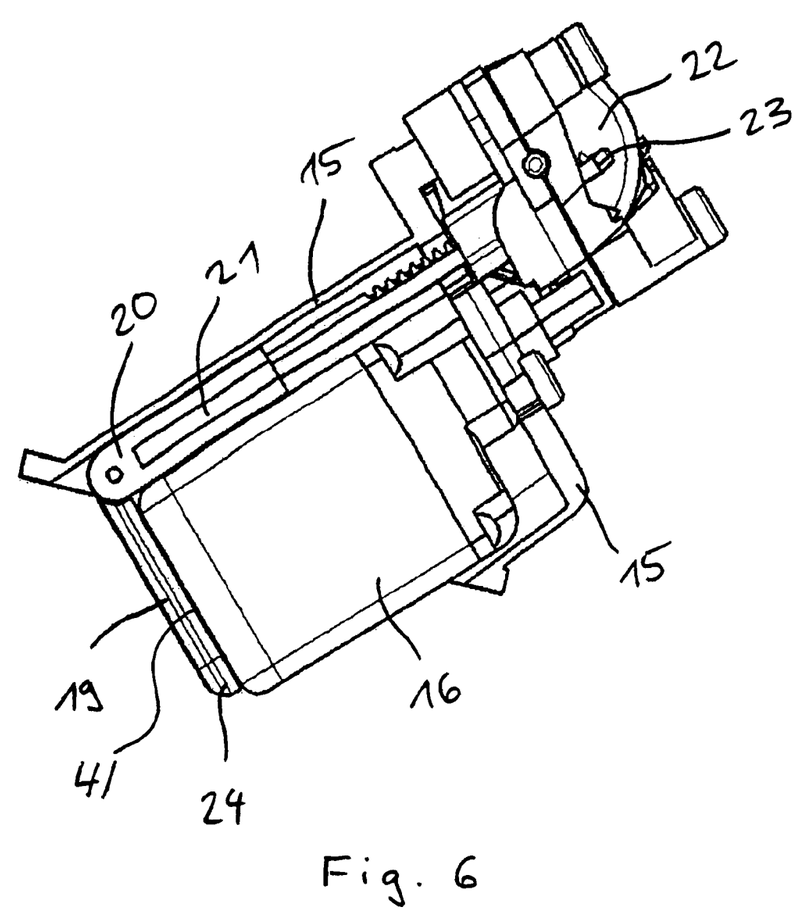
FIG. 6 is a side view of the image acquisition unit according to FIG. 5 in the closed position.

The functioning of the image acquisition unit 14 is shown clearly in FIGS. 5 and 6. When the image acquisition unit 14 is activated, the drive mechanism 18 is started and retracts the carriage 20 via the toothed rack 23. This causes the cover 19 to be pivoted upwards against the spring force due to its position on the top side of the camera, thus exposing the camera lens 17 so that the field of view is unobscured for the camera 16. Wiping of the camera lense is performed by the cleaning element 40 affecting a wiping action as the cover 19 is opened and or closed. The drive mechanism 18 may be switched off in its final position either via a limit switch or by cutout upon detection of a rise in current. When the cover 19 is in its final position, the front edge 24 thereof projects slightly, thus sheltering the cameral lens from falling rain.

A sealing element 41 applied to or integral with the cover element 19 on the side of the cover facing the image acquisition unit provides an environmental seal when the cover is in the closed position, thus protecting the image acquisition unit from environmental contaminants such as rain, snow and dust.

Viewing field tolerances are intrinsic to cameras as a result of precision values in the manufacture. These values may be up to +/−20°. Manufacturing tolerances for most vehicles may also be up to +/−2°. If it is intended to use such a camera for example as an image acquisition unit an adjustment mechanism is required in order to ensure that the view will always be consistent. This adjustment arrangement must be capable of adjusting the camera in a range of at least +/−4°. Moreover, the adjustment mechanism must allow extremely precise adjustment and must be very inexpensive.

Figure 7:
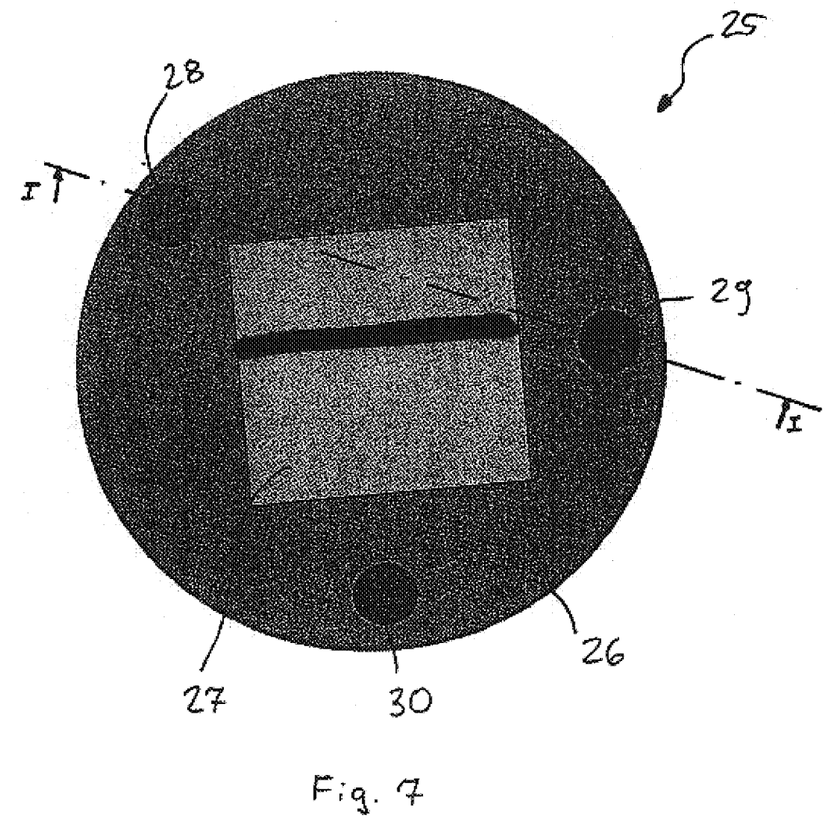
FIG. 7 is a top view of an adjustment mechanism suitable for attachment of an image acquisition unit.
Figure 8:
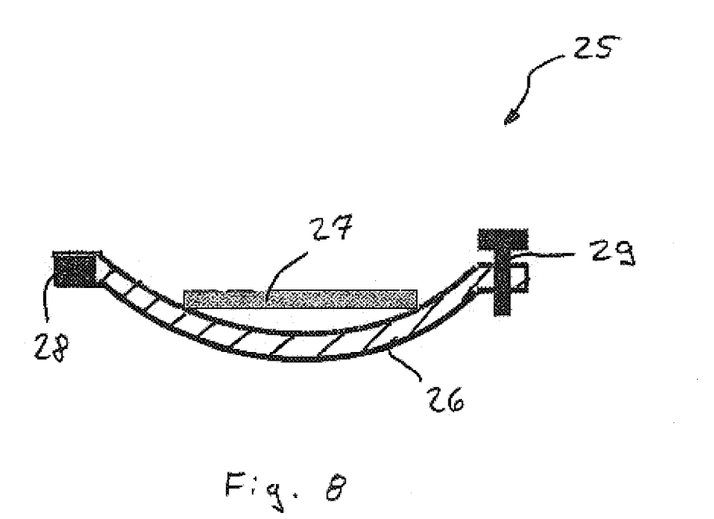
FIG. 8 is a sectional view along line I—I through the adjustment mechanism according to FIG. 7.

FIG. 7 shows a top view of an adjustment mechanism 25 suitable for attachment of an image acquisition unit. An adjustment mechanism 25 of such kind may be disposed for example between the camera housing 15 and the camera 16, so that the alignment of the camera 16 may be adjusted after the camera housing 15 has been mounted in the vehicle.

A base plate 26 and a securing mechanism 27 affixed thereto are provided on the adjustment mechanism 25. The securing mechanism 27 serves to attach a camera to the adjustment mechanism 25. The base plate 26 may be attached at three points, for example to a suitable bearing structure. A deforming element 28 is provided on one attachment point, and is deformable when the base plate 26 is adjusted. Two adjusting screws 29 and 30 are provided at the other two attachment points, so that the base plate may be adjusted horizontally and vertically together with the camera secured thereto. The camera, which is secured to the adjustment mechanism 25, may be swivelled horizontally and vertically by turning the adjusting screws 29 and 30.

Figure 9:
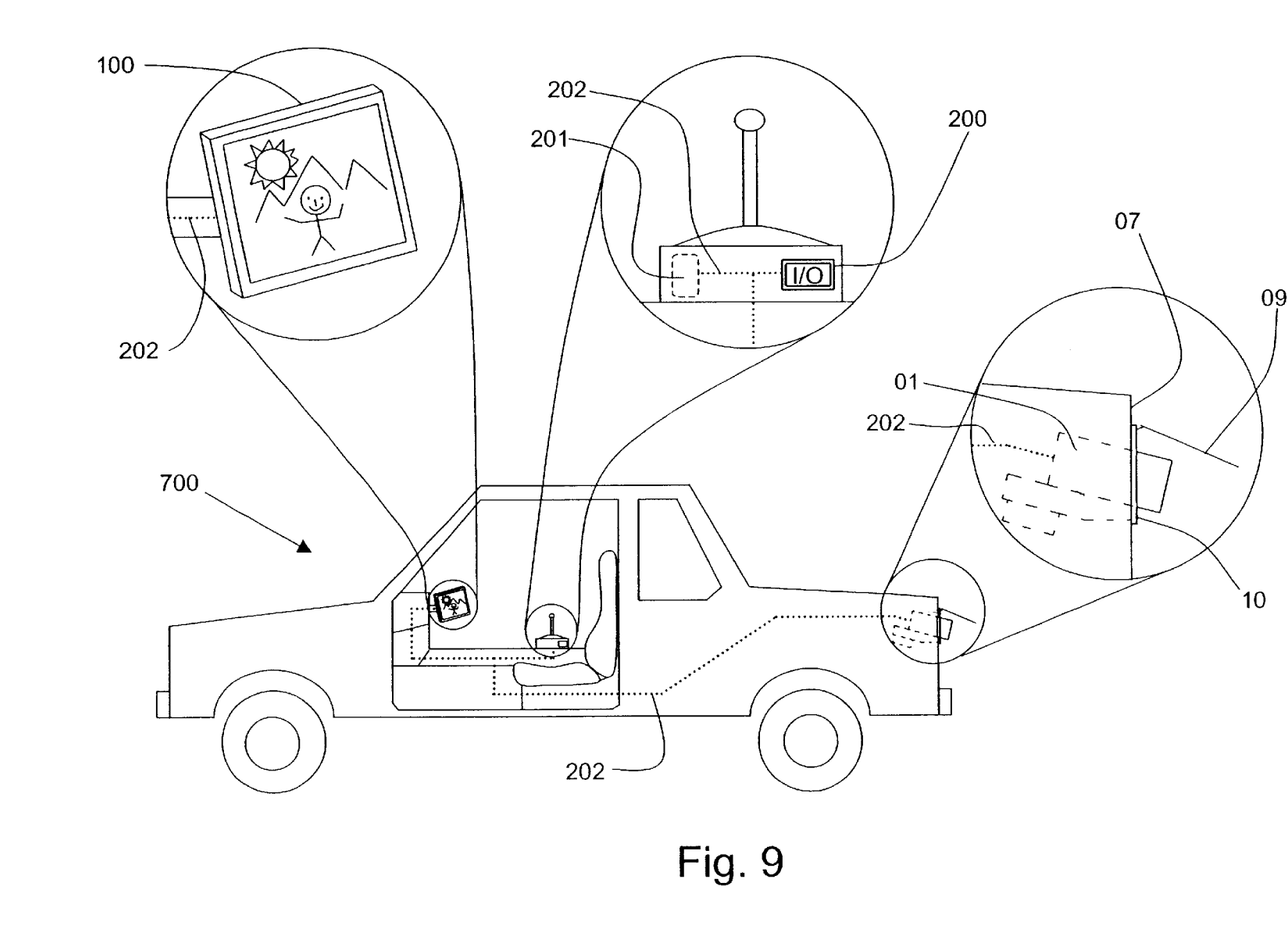
FIG. 9 is a schematic view of the parking and/or maneuvering assistance device of the invention.

FIG. 9 shows the image acquisition unit 01 with graphic display unit 100 in the vehicle 700. As a visual aid, the vehicle 700 is shown with the driver's door and steering wheel removed to reveal the interior passenger compartment of the vehicle. The graphic display unit 100 located in the vehicle displays an image acquired by the image acquisition unit 01, when the system is activated. The graphical display unit 100 may optionally also be used to display data, and/or images of a navigation system. Such graphical display units typically are incorporated as part of the instrument panel or facia of the vehicle at a location visible to the driver when normally operating the vehicle. Preferably images captured external of the vehicle by image acquisition unit 01 (such as a reversing scene or a front parking scene) are displayed by the video screen that is included as part of the vehicle navigation system, that when normally driving on a highway, such screen displays to the driver navigational/directional information. However, when for example a reverse gear is selected, the image acquisition unit 01 is activated/moved to its operative position and the navigational image is replaced by an image capture by the image acquisition unit 01, (preferably with a graphic overlay that guides the driver during the reversing task). When reverse gear is disengaged, the image acquisition unit 01 is de-activated/moved to its resting, stowed position and the image captured by the image acquisition unit 01 is replaced by the navigational image. Further locations for the graphical display unit are possible such as part of a rear view mirror assembly and or part of an accessory module such as disclosed in U.S. patent application Ser. No. 09/793,002 filed Feb. 26, 2001 by SCHOFIELD et al., for a Video Mirror System Incorporating An Accessory Module, said application being incorporated by reference herein.

The image acquisition unit 01 (that preferably comprises a charge coupled device (CCD) video camera or comprises a multi-pixel CMOS video camera device) and the graphic display unit are connected to each other via signal/control lines 202. The protective part 07 is shown, through which the image acquisition unit protrudes. A switching element 200 may be provided wherein the adjustably mounted image acquisition unit 01 and/or the adjustably mounted cover 09 can be controlled by operation of the switching element 200 via the signal/control lines 202, and/or by putting the vehicle in reverse gear (with the sending of a signal through the signal and control lines 202 from a control element 201 of the transmission arrangement) such that the image acquisition unit and/or the cover 09 can be adjusted between the resting, stowed position and the operative position, and vice versa. In the embodiment shown in FIG. 9, the switch element 200 is located in the housing of the transmission shifter unit, however, it is not required that the switch be associated with a control component of the transmission system.

While specific embodiments of the invention have been shown and described in detail to illustrate the application of the principles of the invention, it will be understood that the invention may be embodied otherwise without departing from such principles.

What is claimed is:

1. A parking and/or maneuvering assistance device for a passenger vehicle or a commercial vehicle having a vehicle interior and a vehicle exterior facing an outside, the device comprising:

an image acquisition unit;

a graphic display unit with which the image information recorded by the image acquisition unit can be displayed in the interior of the vehicle either with or without processing;

a protective element, the image acquisition unit being situated behind the protective element so that it is essentially inaccessible from the outside at least in a resting position, the protective element having a opening allocated to the image acquisition unit; and a drive mechanism and an adjustable cover provided on the outside of the protective element, the adjustable cover being adjustable in position by the drive mechanism between a resting position, in which the opening in the protective element is essentially covered by the cover and at least one operating position which is different from the resting position and in which the images of the observation area located outside the vehicle can be recorded through the opening by the image acquisition unit situated behind the protective element or in which the image acquisition unit can extend through the opening in the protective element for at least a short distance.

2. The device according to claim 1, wherein the image acquisition unit is mounted rigidly behind the protective element, the opening being provided relative to the image acquisition unit to form an image recording passage through the opening to allow imaging the observation area located outside the vehicle by means of the image acquisition unit situated behind the protective element.

3. The device according to claim 1, wherein the adjustable cover comprises a pane of glass with a conductive coating.

4. The device according to claim 1, further comprising transmission elements wherein the drive mechanism comprises a common drive mechanism driving the adjustable image acquisition unit and the adjustable cover, with movements of the common drive mechanism being transmitted by transmission elements connecting the cover and the image acquisition unit to the common drive mechanism either together or separately from one another.

5. The device according to claim 1, wherein the cover comprises a manufacturer's emblem or a nameplate.

6. The device according to claim 1, wherein the cover is pivotable about a swivel axis between a resting position and an operating position.

7. The device according to claim 1, wherein the cover can be rotated in its plane about an axis of rotation between the resting position and the operating position, the axis of rotation being arranged eccentrically with respect to the center of the cover and running essentially perpendicular to the plane of the cover.

8. The device according to claim 1, further comprising at least one cleaning element provided on a side of the cover facing the image acquisition unit.

9. The device according to claim 1, further comprising at least one sealing element on a side of the cover facing the image acquisition unit.

10. The device according to claim 1, further comprising a locking element wherein the cover can be locked in the resting position with the locking element.

11. The device according to claim 1, further comprising a switching element wherein the adjustably mounted image acquisition unit and/or the adjustably mounted cover can be controlled by operation of said switching element and/or by putting the vehicle in reverse gear such that the image acquisition unit and/or the cover can be adjusted between the resting position and the operating position and vice versa.

12. The device according to claim 1, further comprising a lighting device provided with the image acquisition unit, whereby the observation area outside the vehicle can be illuminated at least in part.

13. The device according to claim 1, wherein the protective element is formed by a part of the vehicle body, the trunk lid or vehicle part.

14. The device according to claim 1, wherein the graphic display unit is designed as a display on which data and/or images of a navigation system may optionally also be displayed.

15. The device according to claim 1, further comprising an adjustment mechanism that is horizontally and/or vertically adjustable, wherein the image acquisition unit is mounted on the adjustment mechanism.

16. The device according to claim 1, wherein said adjustable cover is a transparent element forming a space that is essentially closed to the outside.

17. The device according to claim 16, further comprising a heater for heating the cover element.

18. The device according to claim 1, further comprising an adjustable mount, wherein the image acquisition unit is connected to the adjustable mount and can be adjusted via the drive mechanism between a resting position and at least one operating position which is different from the resting position.

19. The device according to claim 18, wherein the adjustable mount includes a carriage and the image acquisition unit is situated on the carriage and can be adjusted linearly relative to the protective element.

20. The device according to claim 18, wherein the image acquisition unit in at least one operating position extends at least a short distance through the opening.

21. The device according to claim 18, wherein the drive mechanism comprises one of an electric geared motor, a pneumatic geared motor or a hydraulic geared motor.

22. The device according to one claim 18, wherein the drive mechanism comprises a bimetal unit.

* * * * *